Feb. 18, 1941.   C. A. SHIPLETTE   2,232,483
MOTOR
Filed July 13, 1939   2 Sheets-Sheet 2

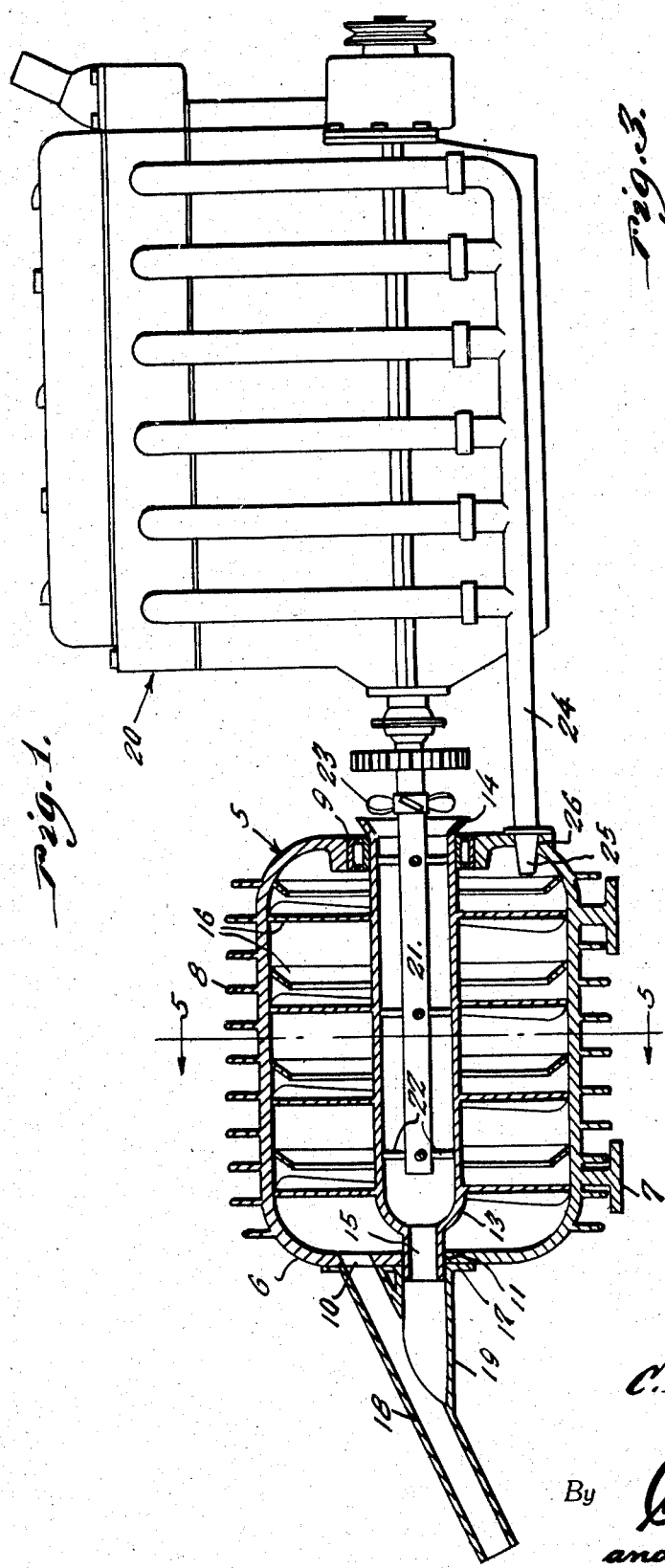

Inventor
C. A. Shiplette

By Clarence A. O'Brien
and Hyman Berman
Attorneys

Patented Feb. 18, 1941

2,232,483

UNITED STATES PATENT OFFICE 2,232,483

MOTOR

Charles A. Shiplette, Glen Morgan, W. Va.

Application July 13, 1939, Serial No. 284,375

3 Claims. (Cl. 60—13)

This invention relates broadly to motors, and an object of the invention is to provide a motor to be used in connection with a prime mover such as a gasoline or oil motor to supplement the power of the latter to the end that maximum power with minimum fuel consumption will be developed.

The invention together with its objects and advantages will be best understood from a study of the following description taken in connection with the accompanying drawings wherein—

Figure 1 is a view showing in side elevation an internal combustion engine with the motor embodying the features of the present invention connected therewith and shown in section.

Figure 2 is an elevational view of the rotor of the motor forming part of the invention.

Figure 3 is an end elevational view of the rotor.

Figure 5:
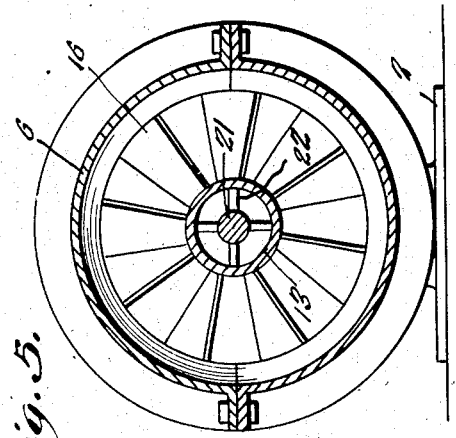
Figure 5 is a sectional view taken substantially on the line 5—5 of Figure 1.
Figure 4:
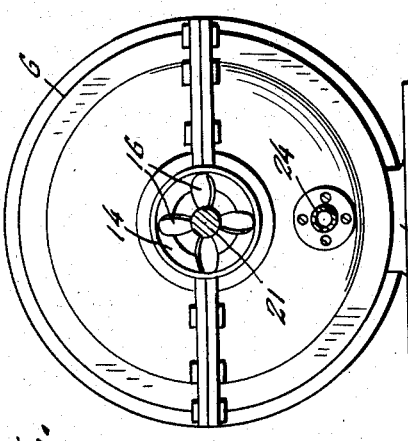
Figure 4 is an end elevational view of the motor embodying the features of the present invention with certain parts shown in section.
Figure 6:
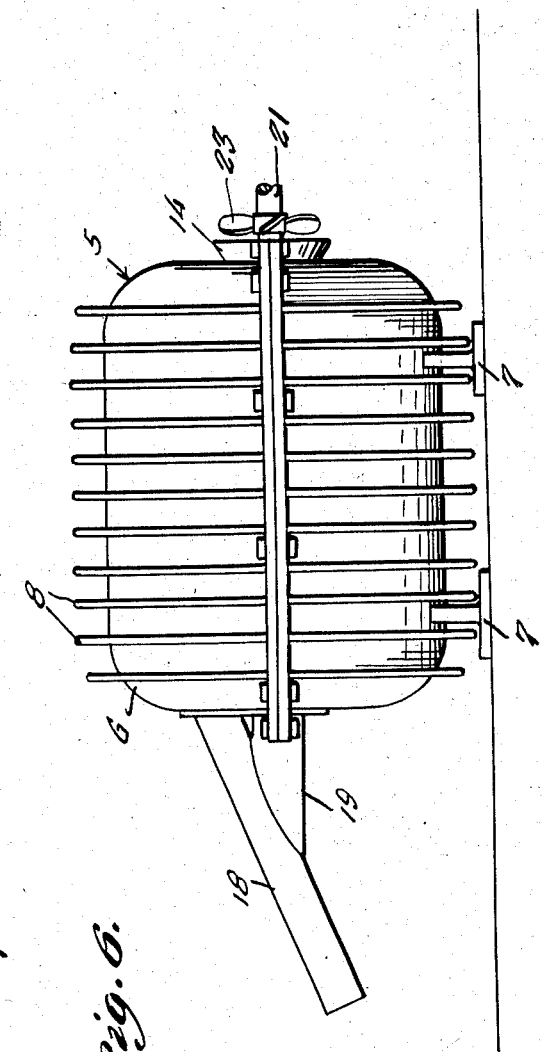
Figure 6 is a side elevational view of the motor embodying the features of the present invention.

Referring more in detail to the drawings it will be seen that in accordance with the present invention there is provided a motor indicated generally by the reference numeral 5, the same embodying a casing 6 provided with brackets 7 through the medium of which the motor casing may be mounted on the chassis frame of a motor vehicle or the like. On the exterior thereof the casing 6 of the motor is provided with cooling fins 8.

At one end thereof the motor casing 6 is provided with a bearing 9 while at the opposite end thereof the casing is provided with an exhaust port 10, and an opening 11 disposed below said port 10.

Operating within the casing 6 is a rotor 12 the same embodying an elongated tubular hub 13 that at one end is provided with a flared inlet 14 and at an opposite end is provided with a restricted tubular outlet 15.

Extending from the hub 13 are circular series of vanes 16.

The series of vanes 16 are longitudinally spaced on the hub 13 as shown and each vane is disposed at the desired or proper pitch.

The flared end 14 of the hub 13 is journaled in the bearing 9 while the outlet neck 15 is accommodated within the opening 11.

Attached to the end of the casing 6 remote from the bearing-equipped end 9 thereof is a manifold 17 that embodies an exhaust tube 18 and a branch conduit 19. The exhaust tube 18 aligns at one end thereof with the opening 10 while the branch 19 accommodates within one end thereof the outlet neck 15 of the hub 13.

Further in accordance with the present invention there is connected with the crank shaft of an internal combustion engine or similar prime mover 20 a shaft extension 21 that is accommodated within the hub 13 and is secured to the hub 13 through the medium of pins or the like 22 that also serve to secure the shaft 21 centered with respect to the hub 13.

On the shaft extension 21 and disposed adjacent the flared inlet of the hub 13 is a fan 23.

Further in accordance with the present invention the exhaust conduit 24 of the internal combustion engine or other prime mover 20 has a discharge end 25 extending into the motor casing 6 through a suitable opening 26 provided in the bearing-equipped end 9 of said motor casing 6.

From the above it will be apparent that the exhaust gases from the internal combustion engine 20 will discharge into the casing 6 of the motor 5 through the outlet 25 of the exhaust conduit 24. The exhaust gases in the casing 6 of the motor 5 will impinge upon the vanes 16 causing the rotor 12 to revolve within the casing 6 so that the rotor will supplement the action of the power pistons of the motor 20. Consequently the motor 20 will develop maximum power with minimum fuel consumption.

Further it will be understood that the fan 23 will force air through the hub 13, the air passing through the hub discharging through the outlet 15 into the manifold 17 at the branch 19 of the manifold. Thus it will be seen that this air at the junction of the exhaust pipe 18 for the motor casing 6 and the branch 19 will set up sufficient suction for drawing the exhaust gases through the casing 6 of motor 5 and out of the casing through the outlet 10 and the exhaust pipe 18 of the motor 5.

From the foregoing it will be seen that I have provided a motor that is relatively simple in construction and which can be readily connected to the crank shaft of the internal combustion engine, and through the medium of which the exhaust gases of the internal combustion engine may be utilized for driving said motor to the end that the latter will coact with the power pistons of the internal combustion engine, resulting in the internal combustion engine developing maximum power with minimum fuel consumption. In this connection it will be apparent that a motor embodying the features of the present invention being driven by the exhaust gases and thus supplementing the action of the power pistons of the internal combustion engine will result in a saving of fuel consumption on the part of the main prime mover or internal combustion engine with, at the same time, an increase in power of said prime mover or internal combustion engine.

It is thought that a clear understanding of the construction, utility and advantages of an invention of this character will be had without a more detailed description.

Having thus described the invention what is claimed as new is:

1. In combination with a prime mover embodying a crank shaft and an exhaust conduit, a motor embodying a casing, a rotor journaled within said casing, a hollow hub passing through the casing and rotatably arranged therein and to which the rotor is connected, a shaft extending into the hub and fastened thereto, means for connecting the shaft with the crankshaft of the prime mover, the exhaust conduit of said prime mover having a discharge end extending into and terminating within the casing of said motor whereby the exhaust discharging into the casing of said motor will drive said rotor, and the casing of said motor being provided at one end thereof with an exhaust port, a discharge conduit leading from the exhaust port, a discharge pipe extending from the rear end of the hollow hub and intersecting the exhaust pipe at an intermediate part thereof and blades connected with the shaft for forcing air through the hollow hub and into the exhaust pipe to create a suction in the casing and exhaust pipe.

2. A motor for use in connection with an internal combustion engine, said motor embodying a casing, a rotor mounted in said casing, said rotor including a shaft, a hub mounted on said shaft to rotate therewith, means connecting said hub to the shaft and serving to space the hub circumferentially with respect to said shaft, a plurality of circular series of vanes mounted on said hub, said series of vanes being relatively spaced longitudinally of said hub, and said hub being provided at one end with an air intake mouth, and at an opposite end with an air exhaust, said casing being also provided at one end thereof with an exhaust port, and a manifold mounted on said end of the casing and embodying an exhaust conduit registering with said exhaust port and a branch conduit registering with the air outlet of said hub; said shaft being adapted to be connected at one end thereof with the crank shaft of an internal combustion engine, and said casing at the end thereof remote from said manifold being provided with an opening for accommodating the discharge end of the exhaust manifold of the internal combustion engine whereby the exhaust gases discharging from said manifold will impinge upon said vanes for driving said rotor; and a fan mounted on said shaft adjacent the air inlet end of said hub for forcing air through said hub and the first-mentioned manifold.

3. In a device of the class described, a casing, a rotor journaled in the casing, said rotor including a hollow hub extending through the casing and rotatably arranged therein, a shaft passing into the hub and fastened thereto with the shaft spaced from the hub to provide an air passage, means for forcing fluid into the casing to rotate the rotor, an exhaust conduit leading from the casing for the passage of the fluid from the casing and fan blades connected with the shaft for forcing air through the hollow hub and means for leading the air from the hollow hub into the conduit to draw fluid from the casing through the conduit.

CHARLES A. SHIPLETTE.